Figure 1:
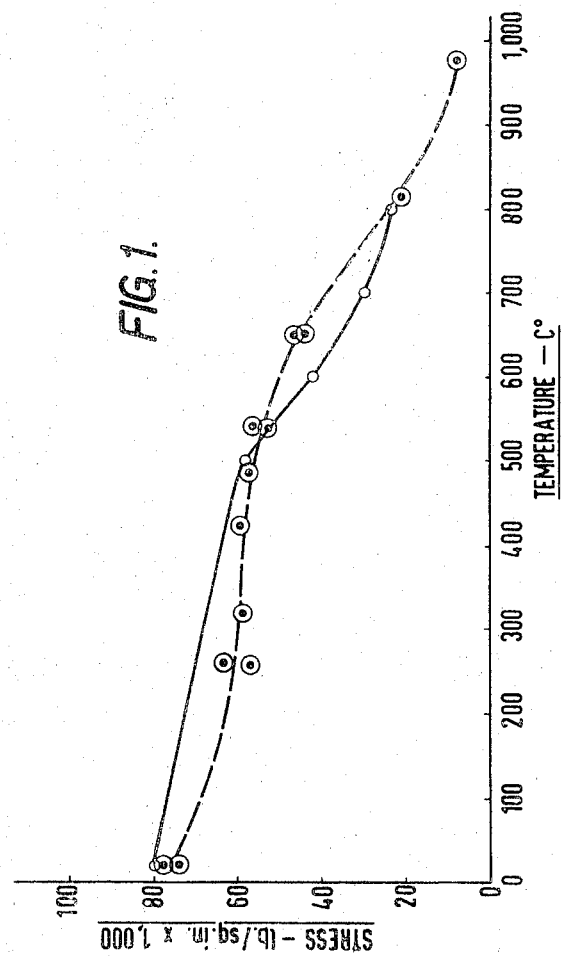

Jan. 31, 1967  L. H. COPE  3,301,668
STAINLESS STEEL ALLOYS FOR NUCLEAR REACTOR FUEL ELEMENTS
Filed Feb. 23, 1965  4 Sheets-Sheet 4

3,301,668
STAINLESS STEEL ALLOYS FOR NUCLEAR
REACTOR FUEL ELEMENTS
Lawrence Henry Cope, Culcheth Warrington, England, assignor to United Kingdom Atomic Energy Authority, London, England
Filed Feb. 23, 1965, Ser. No. 434,224
Claims priority, application Great Britain, Feb. 24, 1964, 7,688/64
2 Claims. (Cl. 75—128)

The present invention relates to stainless steel and is concerned more particularly with the encasement in stainless steel of the fuel of nuclear reactor fuel elements.

The mechanical properties especially necessary in a metal encasing nuclear fuel are strength and ductility under service conditions. These conditions involve prolonged operation at high temperatures up to 650° C. and it is therefore, at these temperatures and after lengthy periods of time in service (typically one year) that the properties should be judged. Stainless steels have been developed for high temperature applications and have the added advantage of good resistance to corrosion, a property having particular importance for liquid metal cooled reactors such as fast reactors cooled by sodium.

Existing standard specifications for stainless steels tend to be far wider in their individual components limitations than is necessary for steelmaking purposes. A case in point is the specification designated Type 316L by the American Iron and Steel Institute; it is as follows, the percentages quoted being by weight:

| | |
|---|---|
| Carbon, percent max. | 0.03 |
| Chromium, percent | 16 to 18 |
| Nickel, percent | 10 to 14 |
| Molybdenum, percent | 2 to 3 |
| Manganese, percent max. | 2.0 |
| Silicon, percent max. | 1.0 |
| Phosphorus, percent max. | 0.040 |
| Sulphur, percent max. | 0.020 |

When working to a specification such as this, it is usual for the steelmakers to adopt their own narrower limits which are chosen with the object of biasing the properties to suit a particular application or of reducing the cost of the product.

The present invention is based on the finding that a particular narrow specification substantially within the 316L specification set out above gives a stainless steel which, besides good creep strength, possesses remarkable high temperature creep rupture ductility, that is to say, the ability to yield or creek in a ductile manner to considerable degrees of elongation before failure by rupture occurs. The specification according to the invention is:

| | |
|---|---|
| Carbon, percent max. | 0.06 |
| Chromium, percent | 16.5 to 17.5 |
| Nickel, percent | 13.0 to 14.0 |
| Molybdenum, percent | 2.0 to 2.75 |
| Manganese, percent | 1.5 to 2.0 |
| Silicon, percent max. | 0.8 |
| Phosphorus, percent max. | 0.020 |
| Sulphur, percent max. | 0.020 |
| Nitrogen, percent max. | 0.06 |
| Arsenic, percent max. | 0.035 |
| Tin, percent max. | 0.020 |
| Vanadium, percent max. | 0.15 |

It is assumed of course that the balance is iron apart from incidental impurities other than those specified. Such of these other impurities as are significant on nuclear grounds are preferably controlled so as not to exceed the following upper limits:

| | Percent |
|---|---|
| Boron | 0.003 |
| Cobalt | 0.030 |

In accordance with the invention a nuclear reactor fuel element, especially one intended for a fast reactor, has encasing its fuel a stainless steel according to the above narrow specification. By virtue of the remarkable rupture ductility, it can be expected of such an element that any tendency towards fracture of the encasement will be heralded by a prolonged period of deformation preceding actual rupture. The stainless steel encasement may constitute sheathing, matrix metal in the case of fuel of the dispersion type, or both. With dispersion fuel having a stainless steel matrix it is advantageous that the sheath is the same as the matrix. A particular example of fuel element to which the invention is applicable is an elongated pin-like fast reactor fuel element in which cermet pellets of oxide fuel dispersed in stainless steel matrix are sheathed in stainless steel.

The steel of the invention employs a careful balance of the austenitising influence of such components as carbon, nickel and manganese with the ferrite forming influence of such components as chromium, molybdenum and manganese, the aim being to secure a fully austenitic microstructure, or at least one with little residual ferrite, in the belief such an initial microstructure together with the carefully controlled composition offers the best prospects of long-term stability. In particular, the nickel content is placed relatively high in order to gain best advantage from its austenitising influence. In the case of the carbon content, the limit has been drawn with regard to the need of not having more than can be adequately stabilised against nucleation and growth in service. The inherent microstructural stability is also conducive to resistance against structural change by neutron irradiation.

By way of illustration of the invention, a melt was prepared by air melting to a composition ascertained by subsequent chemical analysis to have the following proportions by weight of the main alloy components:

| | Percent |
|---|---|
| Carbon | 0.02 |
| Chromium | 16.7 |
| Nickel | 13.06 |
| Molybdenum | 2.43 |
| Manganese | 1.56 |
| Silicon | 0.57 |
| Phosphorous | 0.017 |
| Sulphur | 0.015 |
| Arsenic | 0.020 |
| Boron | 0.001 |
| Cobalt | 0.020 |
| Nitrogen | 0.020 |
| Tin | 0.010 |
| Vanadium | 0.020 |

Mechanical tests, as hereinafter set out, were performed on specimens of this melt having a cross sectional area of 0.1 sq. in. and previously given an annealing heat treatment at 1050° C. for 30 minutes followed by air cooling, the resultant grain size being uniformly fine with an average diameter of $1.5 \times 10^{-3}$ inches.

The tests of high temperature tensile properties gave the following results:

TABLE I

| Temperature, °C. | Ultimate tensile strength, lb./sq. in. | Elongation, percent | Reduction of area, percent |
|---|---|---|---|
| Room Temperature | $79.7 \times 10^3$ | 90 | 78 |
| 500 | 57.8 | 50 | 60 |
| 600 | 42.0 | 46 | 60 |
| 700 | 29.1 | 45 | 62 |
| 800 | 23.5 | 42 | 42 |

In the accompanying drawings, FIGURE 1 shows a curve of the above values of ultimate tensile strength plotted against temperature. For comparison there is also included as a broken line a curve drawn through the plotted values which have been obtained for nominally 316L stainless steel from the American Society for Testing Materials Special Technical Publication No. 124 (1952) entitled "The elevated temperature properties of stainless steels."

Tests of the high temperature creep properties gave the following tabulated results:

TABLE II

| Temperature, °C. | Stress, lb./sq. in. | Minimum Secondary creep rate, $10^{-6}$ in./in./hr. | Duration of test, hr. |
|---|---|---|---|
| 600 | 15,000 | 2.3 | 3,198 |
|  | 13,500 | 2.15 | 1,849 |
|  | 13,500 | 2.4 | 2,186 |
|  | 12,000 | 0.9 | 1,902 |
|  | 11,000 | 1.1 | 2,320 |
|  | 10,000 | 0.7 | 1,668 |
|  | 9,000 | 0.24 | 3,300 |
| 650 | 18,500 | 100 |  |
|  | 3,700 | 0.1 |  |
| 700 | 5,000 | 3.2 | 3,030 |
|  | 4,000 | 1.28 | 3,148 |
|  | 3,500 | 0.9 | 2,094 |
|  | 3,000 | 0.51 | 2,808 |
|  | 2,750 | 0.3 | 2,580 |
|  | 2,500 | 0.16 | 5,300 |
| 800 | 2,500 | 20 | 765 |
|  | 1,500 | 3.7 | 2,569 |
|  | 750 | 1.0 | 2,261 |
|  | 400 | 0.3 | 4,600 |

Figure 2:
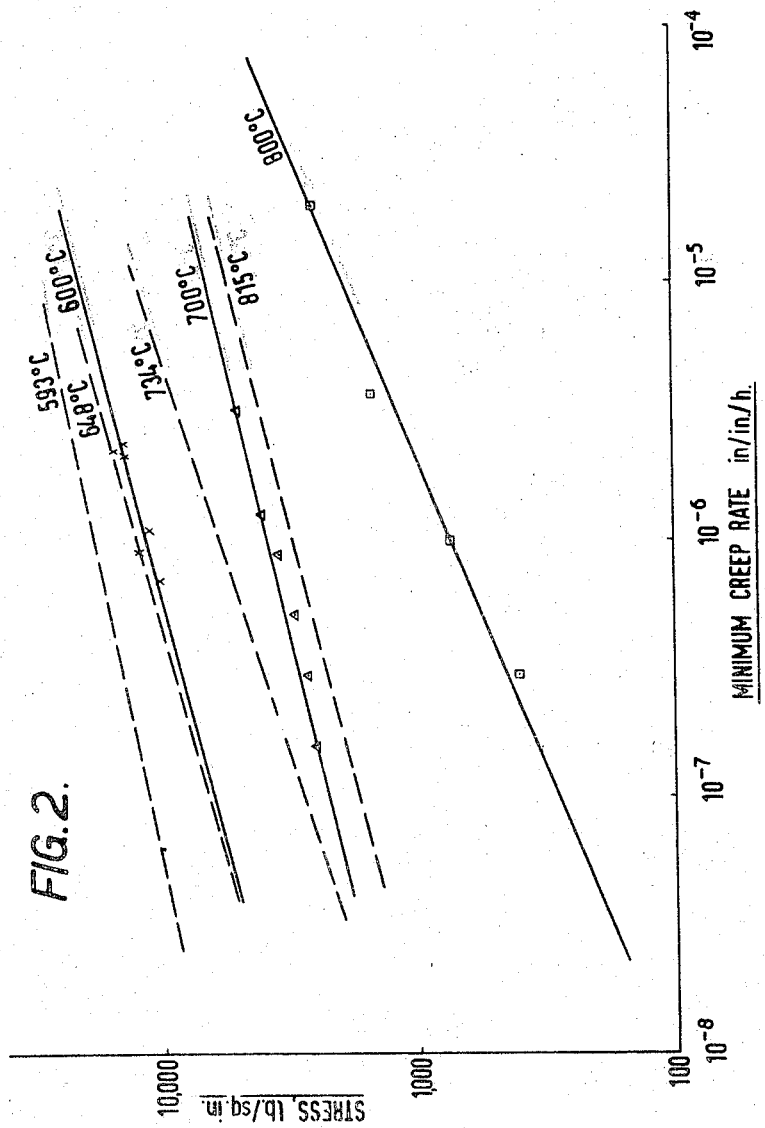

The above data with the exception of the points at 650° C. are consolidated in FIGURE 2 where straight lines shown in full have been drawn as best approximations to the plotted points. Also included for comparison are the broken lines representing the similar data derived in respect of nominally 316 stainless steel from the ASTM publication previously quoted, the 316 specification being the same as 316L except for the permitted carbon content. The carbon contents for the ASTM results are in the region of 0.08%.

Creep testing to rupture gave the following results in which the duration of test represents the time to fracture of the specimen:

TABLE III

| Temperature, °C. | Stress, lb./sq. in. | Minimum secondary creep rate, in./in./hr. | Duration of test, hr. | Elongation, percent |
|---|---|---|---|---|
| 600 | 30,000 | $6.6 \times 10^{-4}$ | 174 | 50 |
| 700 | 17,000 | $1.73 \times 10^{-3}$ | 146 | 82 |
|  | 13,000 | $3.2 \times 10^{-4}$ | 902 | 74 |
|  | 12,000 | $2.0 \times 10^{-4}$ | 1,429 | 87.2 |
| 800 | 7,500 | $1.55 \times 10^{-3}$ | 310 | 88.3 |
|  | 6,500 | $7.9 \times 10^{-4}$ | 544 | 76.7 |
|  | 5,700 | $2.9 \times 10^{-4}$ | 4,209 | 32.2 |

Figure 3:
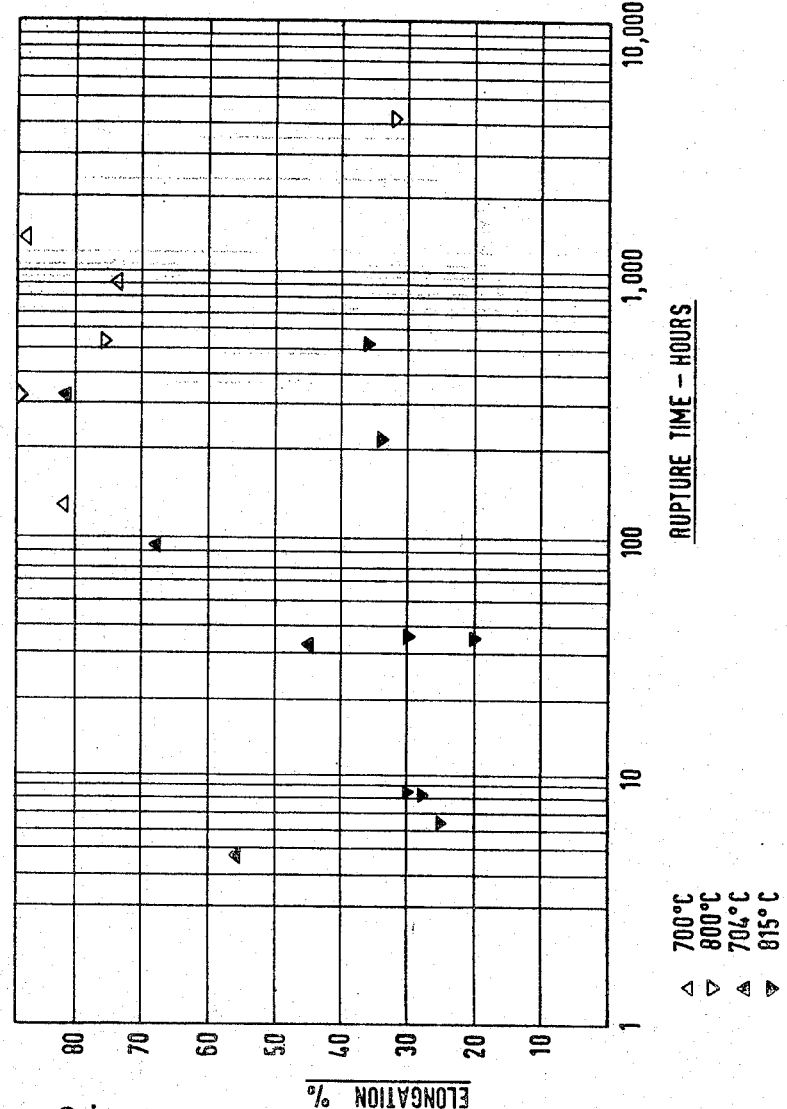

The last column reveals the high rupture ductility of this material in that all the specimens with the exception of only one have not failed until the elongation is at least 50%. In FIGURE 3 the elongation is plotted against rupture time for the tests at 700° C. and 800° C. The most closely comparable results in respect of nominally 316 stainless steel from the ASTM publication previously quoted are also included, these begin in respect of 704° C. and 815° C.

Superior impact properties have also been established and these are coupled with an ability of retaining them despite prolonged exposure to high temperature. Such exposure is a test for degradation by the formation of precipitated phases. For high temperature treatments extending up to 1000 hours at various temperatures up to 850° C. the bulk of the results obtained by the Charpy V-notch test performed at room temperature lay within the range 180 to 200 ft. lbs. and the lowest recorded was about 160 ft. lbs.

Another melt of closely similar composition although, as a point of particular significance, having a lower carbon content at a level of 0.01% by weight was prepared by double vacuum melting, these steps being performed by vacuum induction melting followed by consumable arc vacuum remelting. This other melt was found on testing to have a creep strength somewhat less than that of the melt first described and whilst the carbon content may be a contributory factor it is also possible that the lower gas content to be expected in vacuum melted material could be responsible to some extent. On a specimen tested to rupture at 700° C. and a stress of 13,000 lb./sq. in. the time to rupture was 421 hours and the elongation 92%, indicating that this composition is suitable where ductility is the overriding consideration rather than creep strength, for example where the nuclear fuel can is vented.

Pre-treatments aimed to improve creep strength can be employed. For example, the steel may be subject to a tensile strain of about 20%, possibly followed by a heat treatment sequence of 24 hours at 480° C. and about 200 hours at 705° C. Such cold working causes a precipitation which can have the effect of pinning dislocations. It is considered preferable however to increase the carbon content, at least 0.3% total carbon having been shown to give improved performance as indicated by the following results for as steel having the following proportions by weight of the main alloy components.

|  | Percent |
|---|---|
| Carbon | 0.037(5) |
| Chromium | 17.3 |
| Nickel | 13.8 |
| Molybdenum | 2.41 |
| Manganese | 1.8 |
| Silicon | 0.62 |
| Phosphorus | <0.010 |
| Sulphur | 0.005 |
| Arsenic | <0.005 |
| Boron | 0.0008 |
| Cobalt | 0.014 |
| Nitrogen | 0.029 |
| Tin | <0.01 |
| Vanadium | 0.033 |

TABLE IV

| Temperature, °C. | Stress, lb./sq. in. | Secondary creep rate, in./in./hr. | Duration of test, hr. | Elongation, percent |
|---|---|---|---|---|
| 650 | 6,000 | $1 \times 10^{-7}$ |  |  |
|  | 9,000 | $1.6 \times 10^{-6}$ |  |  |
|  | 24,000 | $3.6 \times 10^{-6}$ | 802 | 85 |
|  | 26,000 | $9 \times 10^{-4}$ | 194 | 71 |
|  | 30,000 | $1 \times 10^{-3}$ | 144 | 56 |
| 700 | 4,000 | $1 \times 10^{-7}$ |  |  |
|  | 16,000 |  | 702 | 80 |
|  | 22,500 | $2.2 \times 10^{-3}$ | ~72 | 77 |

These results in Table IV may be compared with the results given in Tables II and III and illustrated in FIGS. 2 and 3, and also with the additional results obtained at 650° C. with a steel containing 0.02% carbon:

TABLE V

| Stress, lb./sq. in. | Duration of Test (hrs.) | Elongation, percent |
|---|---|---|
| 25,000 | 757 | 72.5 |
| 22,000 | 2,329 | 80.4 |
| 20,000 | 590 | 71 |

In addition as a further indication of good stress-rupture ductility tube burst tests (internal pressure) have been conducted on the steel with relatively low carbon content (0.02%) and on steel with the following proportions of the main alloy components:

| | Percent |
|---|---|
| Carbon | 0.05 |
| Chromium | 17.3 |
| Nickel | 13.8 |
| Molybdenum | 2.43 |
| Manganese | 1.78 |
| Silicon | 0.53 |
| Phosphorus | 0.01 |
| Sulphur | <0.005 |
| Nitrogen | 0.05 |
| Arsenic | <0.005 |
| Tin | <0.010 |
| Vanadium | 0.0275 |
| Cobalt | 0.009 |
| Boron | 0.0001 |

Results for the lower carbon steel are as follows:

TABLE VI

| Tube dimensions | | Hoop stress (p.s.i.) | Temp., °C. | Time to rupture (hrs.) | Increase on diameter at rupture (percent) | |
|---|---|---|---|---|---|---|
| Int. dia. (in.) | Wall (in.) | | | | Mean | Max. |
| 0.2 | 0.015 | 13,300 | 750 | 5 | 3.5 | 3.9 |
| 0.2 | 0.015 | 13,300 | 750 | 35.5 | 21 | 22 |
| 0.2 | 0.015 | 11,600 | 750 | 64 | 10.4 | 10.7 |
| 0.2 | 0.015 | 9,300 | 750 | 213 | 13.2 | 13.5 |
| 0.2 | 0.015 | 11,700 | 700 | 706 | 19.6 | 20.0 |
| 0.2 | 0.015 | 11,000 | 700 | 350 | 11.3 | 11.7 |
| 0.2 | 0.015 | 12,300 | 700 | 220 | 7.0 | 7.5 |
| 0.2 | 0.015 | 13,000 | 700 | 288 | 11 | (¹) |
| 0.2 | 0.015 | 12,300 | 700 | 340 | 11.7 | 12.1 |
| 0.2 | 0.015 | 13,000 | 700 | 162 | 9.5 | (¹) |
| 0.2 | 0.015 | 10,650 | 700 | 684 | 13.2 | 13.4 |
| 0.4 | 0.015 | 7,350 | 750 | 211 | 8.4 | 8.8 |
| 0.4 | 0.015 | 10,000 | 750 | 45 | 14.6 | 15.1 |
| 0.4 | 0.015 | 6,000 | 750 | 239 | 11.8 | 12.0 |
| 0.4 | 0.015 | 4,650 | 750 | 312 | 20 | (¹) |
| 0.4 | 0.015 | 6,000 | 650 | *3,360 | 1.8 | |
| 0.4 | 0.015 | 4,660 | 650 | *3,360 | 0.2 | |

¹ Explosive failure.
*These tests discontinued. Failure did not occur.

Figure 4:
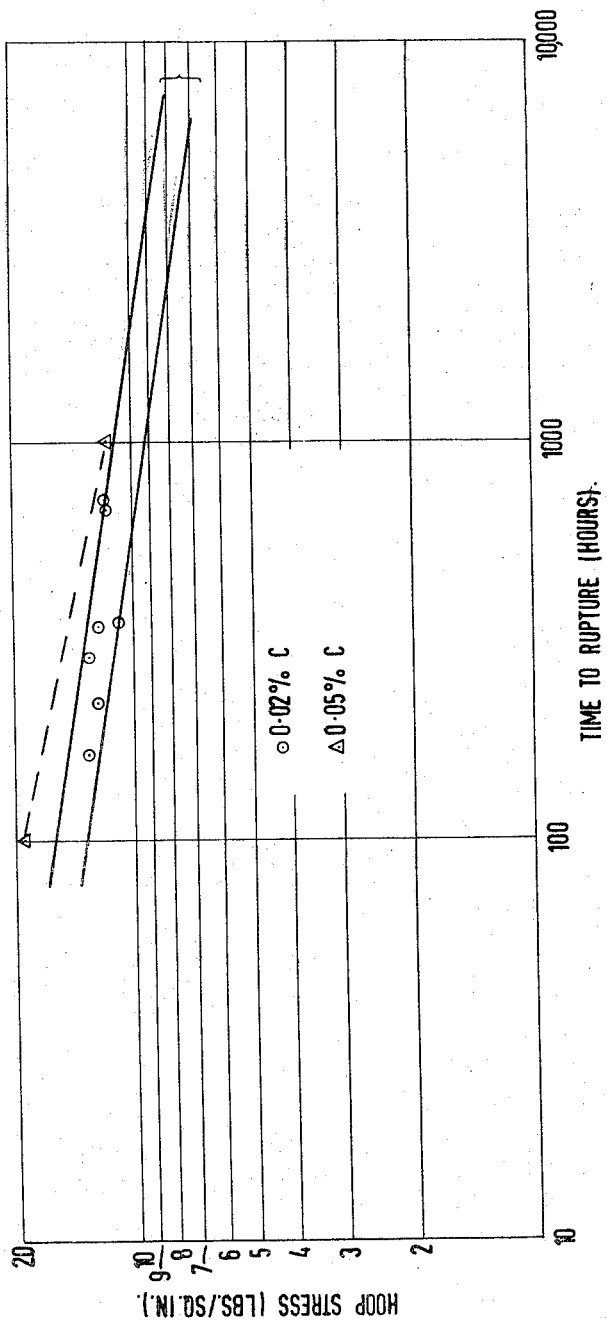

The results obtained at 700° C. are depicted graphically in FIG. 4. Superimposed are results for the higher carbon steel, also obtained at 700° C.

With this higher carbon steel increases on tube diameter of 9–19% at rupture have been observed.

I claim:

1. Stainless steel having the following composition

| | |
|---|---|
| Carbon, percent max. | 0.06 |
| Chromium, percent | 16.5 to 17.5 |
| Nickel, percent | 13.0 to 14.0 |
| Molybdenum, percent | 2.0 to 2.75 |
| Manganese, percent | 1.5 to 2.0 |
| Silicon, percent max. | 0.8 |
| Phosphorus, percent max. | 0.020 |
| Sulphur, percent max. | 0.020 |
| Nitrogen, percent max. | 0.06 |
| Arsenic, percent max. | 0.035 |
| Tin, percent max. | 0.020 |
| Vanadium, percent max. | 0.15 | the balance being iron apart from incidental impurities.

2. Stainless steel as claimed in claim 1 wherein the carbon content is at least 0.03%.

References Cited by the Examiner

UNITED STATES PATENTS 2,863,818  12/1958  Smith et al. _____ 176—91 X
3,012,951  12/1961  Storchheim _____ 176—91 X
3,139,681  7/1964   Goslee et al. _____ 176—89 X

OTHER REFERENCES

American Iron and Steel Institute Bulletin, "Stainless and Heat Resisting Steels," April 1963, pp. 16, 17, and 19.

CARL D. QUARFORTH, *Primary Examiner.*

BENJAMIN R. PADGETT, LEON D. ROSDOL,
*Examiners.*

M. J. SCOLNICK, *Assistant Examiner.*